(12) United States Patent
Reddymakireddy et al.

(10) Patent No.: US 11,704,369 B2
(45) Date of Patent: Jul. 18, 2023

(54) METHOD AND SYSTEM FOR GENERATING AND RENDERING A CUSTOMIZED DASHBOARD

(71) Applicant: HCL Technologies Limited, New Delhi (IN)

(72) Inventors: Ranga Reddymakireddy, Hyderabad (IN); Tarun Kumar Sukhu, Pune (IN)

(73) Assignee: HCL Technologies Limited, New Delhi (IN)

(*) Notice: Subject to any disclaimer, the term of this patent is extended or adjusted under 35 U.S.C. 154(b) by 227 days.

(21) Appl. No.: 17/172,677

(22) Filed: Feb. 10, 2021

(65) Prior Publication Data

US 2022/0114214 A1    Apr. 14, 2022

(51) Int. Cl.
| | |
|---|---|
| *G06F 9/445* | (2018.01) |
| *G06F 16/904* | (2019.01) |
| *G06F 16/907* | (2019.01) |
| *G06F 16/9035* | (2019.01) |
| *G06F 3/04817* | (2022.01) |

(52) U.S. Cl.
CPC ........ *G06F 16/904* (2019.01); *G06F 3/04817* (2013.01); *G06F 9/44505* (2013.01); *G06F 9/44521* (2013.01); *G06F 9/44526* (2013.01); *G06F 16/907* (2019.01); *G06F 16/9035* (2019.01); *G06F 2216/01* (2013.01)

(58) Field of Classification Search
CPC ............... G06F 16/904; G06F 3/04817; G06F 9/44505; G06F 9/44521; G06F 9/44526; G06F 16/9035; G06F 16/907; G06F 2216/01; G06F 9/4451; G06F 9/451; G06F 8/38
See application file for complete search history.

(56) References Cited

U.S. PATENT DOCUMENTS

| | | | |
|---|---|---|---|
| 8,869,027 B2 | 10/2014 | Louch et al. | |
| 9,646,276 B2 | 5/2017 | Rea et al. | |
| 9,733,916 B2 | 8/2017 | Wang et al. | |
| 10,031,652 B1 * | 7/2018 | Yang | G06N 7/00 |
| 10,783,015 B2 | 9/2020 | On et al. | |
| 11,194,450 B2 * | 12/2021 | Kuo | G06F 9/451 |
| 2016/0246490 A1 | 8/2016 | Cabral | |
| 2018/0275845 A1 * | 9/2018 | Barbee | G06F 3/0482 |
| 2020/0047617 A1 | 2/2020 | Vlasenko | |

(Continued)

OTHER PUBLICATIONS

Mahdi Ebrahimi, "Serverless plugins—Automatic generation of monitoring dashboards".

*Primary Examiner* — Brian W Wathen

(57) ABSTRACT

This disclosure relates to method and system for generating and rendering a customized dashboard. The method includes initiating a schema-less dashboard canvas through a frontend application that invokes a server-less library. The method further includes integrating a set of widgets selected by a user, from the plurality of native widgets and from the plurality of third-party widgets, with the schema-less dashboard canvas using the server-less library. The method further includes generating metadata for each of the set of widgets based on a corresponding configuration performed by the user. The method further includes associating the metadata with a user account of the user for subsequent rendering of the customized dashboard for the user.

20 Claims, 9 Drawing Sheets

(56) References Cited

U.S. PATENT DOCUMENTS

2021/0141585 A1* 5/2021 Prakash .................... G06F 8/41
2022/0147205 A1* 5/2022 Koste ...................... G06F 9/451
2022/0198362 A1* 6/2022 Griffin ............. G06Q 10/06393

* cited by examiner

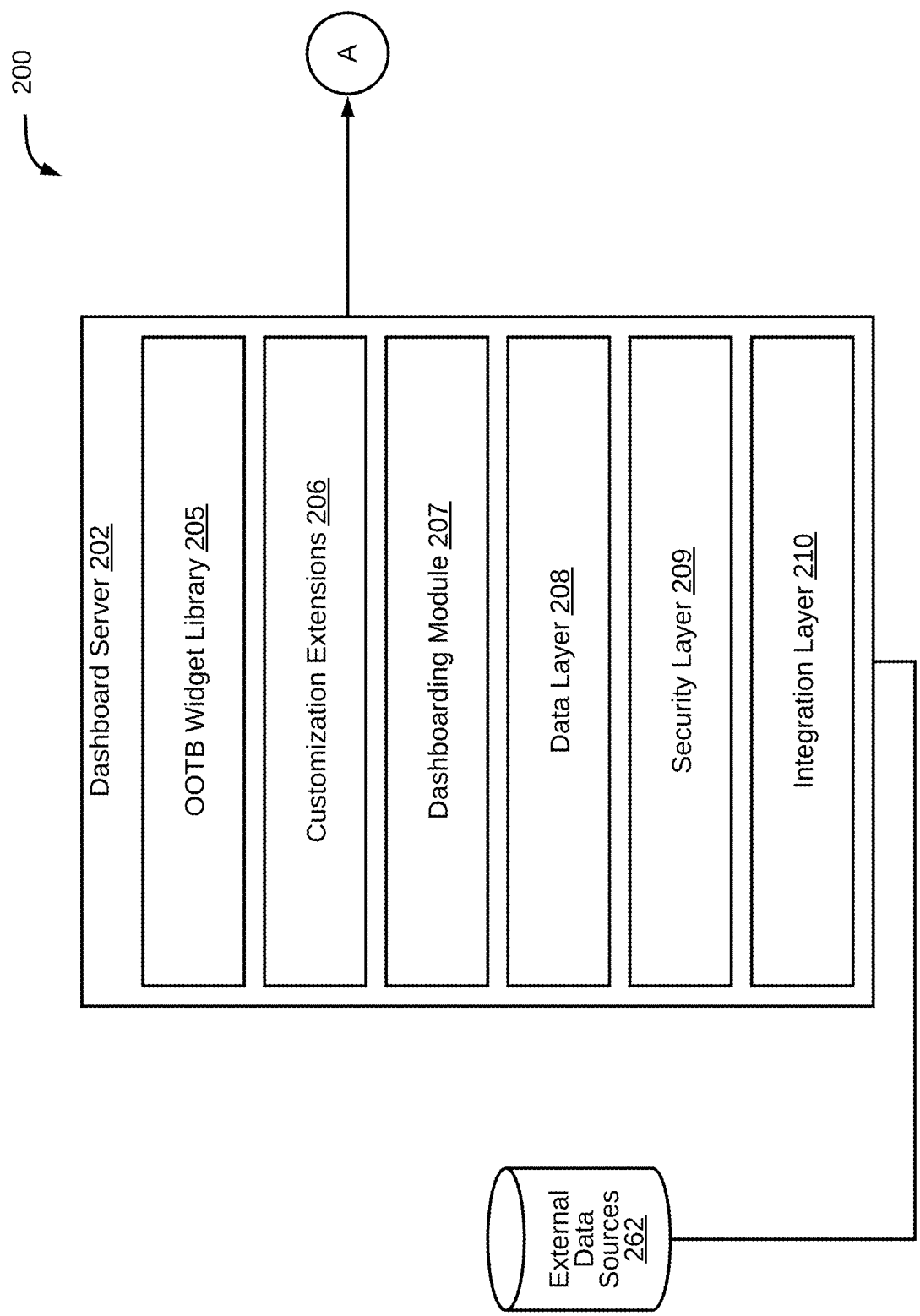

| Layout Layer 701 | Data Layer 702 | Render Component 703 |
|---|---|---|
| Doughnut Chart | Options: Labels, datasets | ChartJS |
| PieChart | Options: Labels, datasets | ChartJS |
| LineChart | Options: Labels, datasets | ChartJS |
| Scatter Plot | Data: Custom JSON, options: margin, xScale, yScale, colors, axisLeft, axisBottom, legends | Nivo/D3/Scatter |
| Sun Burst | Data: Custom JSON, options:margin, colors, childColor, identity, value, cornerRadius, borderWidth, borderColor, animate, motionStiffness, isInteractive | Nivo/D3/burst |
| Swam Plot | Data: Custom JSON, margin, axisTOP, ... | Nivo/D3/Swam |
| Stream | Data: Custom JSON, margin, axisTOP, ... | Nivo/D3/Stream |
| Choropleth | Data: Custom JSON, margin, axisTOP, ... | Nivo/D3/geo |
| Area Bump | Data: Custom JSON, margin, axisTOP, ... | Nivo/D3/Bump |
| Issue Counter | Data: Title, value, options: valueClasses | |

FIG. 7

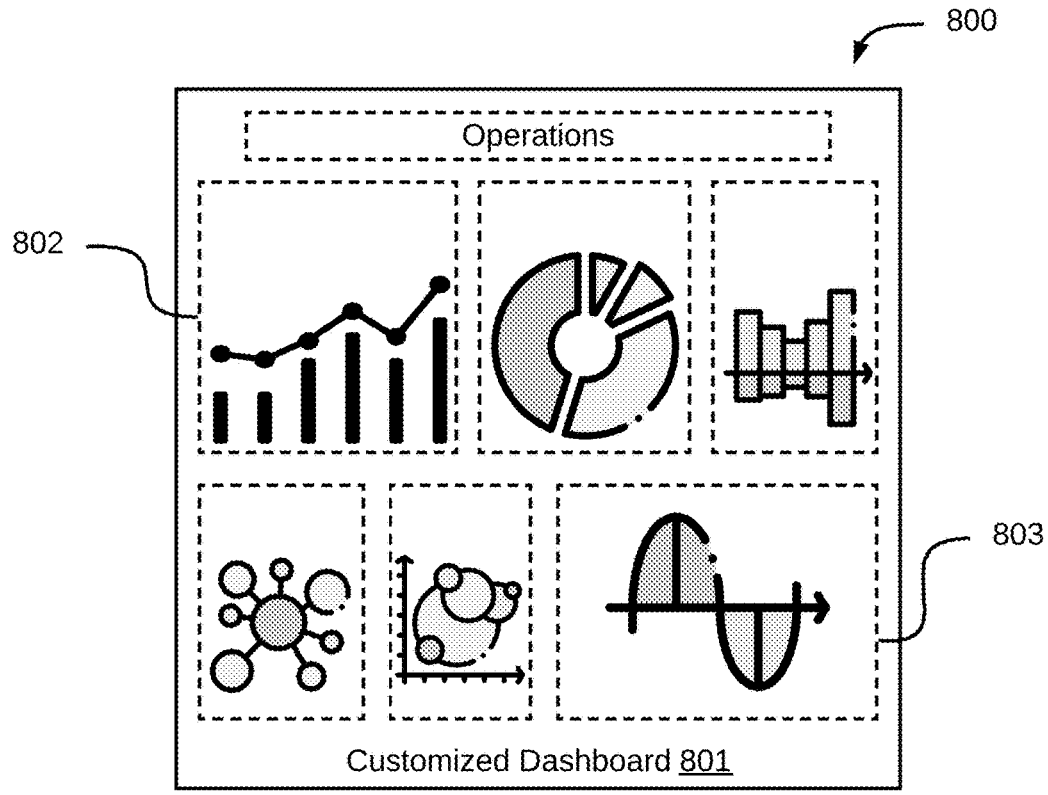

FIG. 8

METHOD AND SYSTEM FOR GENERATING AND RENDERING A CUSTOMIZED DASHBOARD

TECHNICAL FIELD

This disclosure relates generally to dashboard applications, and more particularly to method and system for generating and rendering a customized dashboard.

BACKGROUND

Dashboarding platforms assist organizations in managing human resources, time allocation, decision-making, and assigning projects in a well-organized manner. At present, a customized dashboard is an essential part of the corporate world, aiding in shaping and analyzing key business strategies. A dashboard includes multiple widgets. Each widget may either be a native widget registered with the dashboarding platform or a third-party widget imported from another application.

However, the third-party widget may be incompatible with a dashboarding platform. In the present state of art, the dashboarding platforms are monolithic (server-based). Further, the conventional dashboarding platforms support specific data schemas, data queries, and ingestion protocols. The conventional dashboarding platforms support a given set of User Interface (UI) technologies (for example, React, Angular, JQuery, Vue, and the like) but fail to aggregate each of the set of UI technologies in a single dashboard. Based on a UI technology, legacy systems may require upgradation to support the dashboard platform. Further, scaling of widgets in a dashboard may require additional hardware.

Thus, the techniques in the present state of art fail to address the problem of customization of dashboards.

SUMMARY

In one embodiment, a method for generating and rendering a customized dashboard is disclosed. In one example, the method may include initiating a schema-less dashboard canvas through a frontend application that invokes a server-less library. The server-less library includes a plurality of native widgets and a plurality of adaptors corresponding to a plurality of third-party widgets. The plurality of third-party widgets is based on one or more different user interface (UI) technologies and one or more different data schemas. The method may further include integrating a set of widgets selected by a user, from the plurality of native widgets and from the plurality of third-party widgets, with the schema-less dashboard canvas using the server-less library. One or more of the selected third-party widgets from the set of widgets are integrated using one or more corresponding adaptors. Each of the set of widgets is independently configurable by the user to generate the customized dashboard. The method may further include generating metadata for each of the set of widgets based on a corresponding configuration performed by the user. The metadata include a set of unique widget properties. The method may further include associating the metadata with a user account of the user for subsequent rendering of the customized dashboard for the user.

In one embodiment, a system for generating and rendering a customized dashboard is disclosed. In one example, the system may include a processor and a computer-readable medium communicatively coupled to the processor. The computer-readable medium may store processor-executable instructions, which, on execution, may cause the processor to initiate a schema-less dashboard canvas through a frontend application that invokes a server-less library. The server-less library includes a plurality of native widgets and a plurality of adaptors corresponding to a plurality of third-party widgets. The plurality of third-party widgets is based on one or more different user UI technologies and one or more different data schemas. The processor-executable instructions, on execution, may further cause the processor to integrate a set of widgets selected by a user, from the plurality of native widgets and from the plurality of third-party widgets, with the schema-less dashboard canvas using the server-less library. One or more of the selected third-party widgets from the set of widgets are integrated using one or more corresponding adaptors. Each of the set of widgets is independently configurable by the user to generate the customized dashboard. The processor-executable instructions, on execution, may further cause the processor to generate metadata for each of the set of widgets based on a corresponding configuration performed by the user. The metadata include a set of unique widget properties. The processor-executable instructions, on execution, may further cause the processor to associate the metadata with a user account of the user for subsequent rendering of the customized dashboard for the user.

In one embodiment, a non-transitory computer-readable medium storing computer-executable instructions for generating and rendering a customized dashboard is disclosed. In one example, the stored instructions, when executed by a processor, may cause the processor to perform operations including initiating a schema-less dashboard canvas through a frontend application that invokes a server-less library. The server-less library includes a plurality of native widgets and a plurality of adaptors corresponding to a plurality of third-party widgets. The plurality of third-party widgets is based on one or more different UI technologies and one or more different data schemas. The operations may further include integrating a set of widgets selected by a user, from the plurality of native widgets and from the plurality of third-party widgets, with the schema-less dashboard canvas using the server-less library. One or more of the selected third-party widgets from the set of widgets are integrated using one or more corresponding adaptors. Each of the set of widgets is independently configurable by the user to generate the customized dashboard. The operations may further include generating metadata for each of the set of widgets based on a corresponding configuration performed by the user. The metadata include a set of unique widget properties. The operations may further include associating the metadata with a user account of the user for subsequent rendering of the customized dashboard for the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 2A-C illustrate a functional block diagram of an end computing device implemented by the exemplary system of FIG. 1, in accordance with some embodiments of the present disclosure.

FIG. 7 illustrates an exemplary table of a set of unique widget properties in metadata corresponding to a widget, in accordance with some embodiments of the present disclosure.

FIG. 8 illustrates an exemplary frontend application implementing a customized dashboard, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
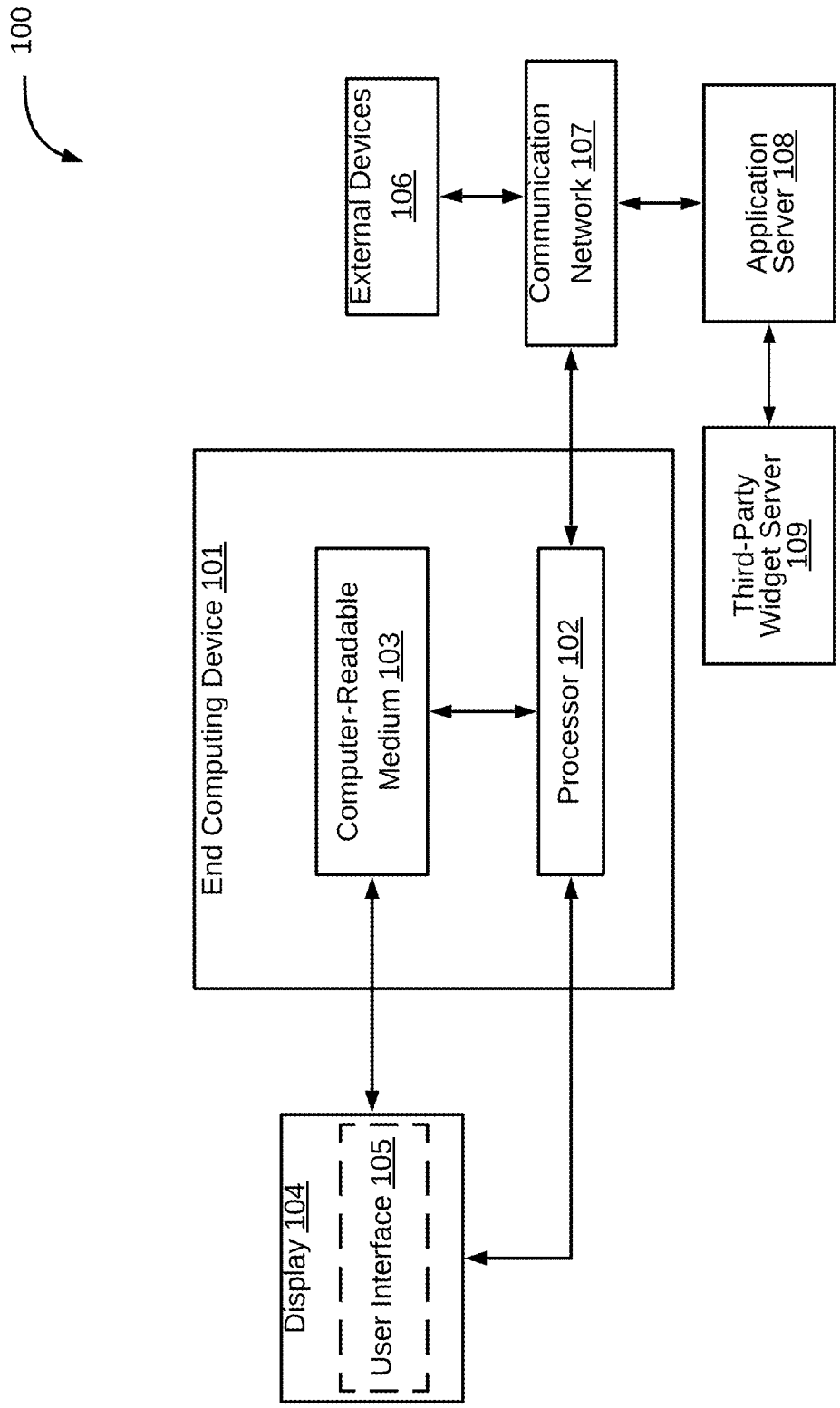
FIG. 1 is a block diagram of an exemplary system for generating and rendering a customized dashboard, in accordance with some embodiments of the present disclosure.

Referring now to FIG. 1, an exemplary system 100 for generating and rendering a customized dashboard is illustrated, in accordance with some embodiments of the present disclosure. The system 100 may include an end computing device 101 (for example, server, desktop, laptop, notebook, netbook, tablet, smartphone, mobile phone, or any other computing device), in accordance with some embodiments of the present disclosure. The end computing device 101 may generate and render a customized dashboard. It should be noted that, in some embodiments, the end computing device 101 may integrate a set of widgets selected by a user with a schema-less dashboard to render and generate the customized dashboard.

As will be described in greater detail in conjunction with FIGS. 2-8, the end computing device may initiate a schema-less dashboard canvas through a frontend application that invokes a server-less library. It should be noted that the server-less library may include a plurality of native widgets and a plurality of adaptors corresponding to a plurality of third-party widgets. It should also be noted that the plurality of third-party widgets may be based on one or more different user interface (UI) technologies and one or more different data schemas. The end computing device may further integrate a set of widgets selected by a user, from the plurality of native widgets and from the plurality of third-party widgets, with the schema-less dashboard canvas using the server-less library. It should be noted that one or more of the selected third-party widgets from the set of widgets may be integrated using one or more corresponding adaptors. Each of the set of widgets may be independently configurable by the user to generate the customized dashboard. The end computing device may further generate metadata for each of the set of widgets based on a corresponding configuration performed by the user. The metadata may include a set of unique widget properties. The end computing device may further associate the metadata with a user account of the user for subsequent rendering of the customized dashboard for the user.

In some embodiments, the end computing device 101 may include one or more processors 102 and a computer-readable medium 103 (for example, a memory). The computer-readable medium 103 may include a schema-less dashboard canvas and a plurality of native widgets and a plurality of adaptors corresponding to a plurality of third-party widgets. Further, the computer-readable storage medium 103 may store instructions that, when executed by the one or more processors 102, cause the one or more processors 102 to generate and render a customized dashboard, in accordance with aspects of the present disclosure. The computer-readable storage medium 103 may also store various data (for example, a dashboard canvas, a set of widgets, a metadata for each of the set of widgets associated with a user account of the user, and the like) that may be captured, processed, and/or required by the system 100.

The system 100 may further include a display 104. The system 100 may interact with a user via a user interface 105 accessible via the display 104. The system 100 may also include one or more external devices 106. In some embodiments, the image privacy protection device 101 may interact with the one or more external devices 106 over a communication network 107 for sending or receiving various data. The external devices 106 may include, but may not be limited to, a remote server, a digital device, or another computing system. Further, the system 100 may include an application server 108 communicatively coupled with the end computing device 101 through the communication network 107. In an embodiment, the end computing device 101 may initiate a schema-less dashboard canvas through a frontend application hosted via the application server 108. The frontend application may invoke a server-less library. It may be noted that the server-less library may include a plurality of native widgets and a plurality of adaptors corresponding to a plurality of third-party widgets. Further, the application server 108 may be communicatively coupled with one or more third-party widget servers (such as third-party widget server 109). The plurality of third-party widgets may be registered with the third-party widget server 109. Once the registration is complete, the end computing device 101 may render the plurality of third-party widgets through a direct communication with the third-party widget server 109 via the communication network 107.

Figure 2B:
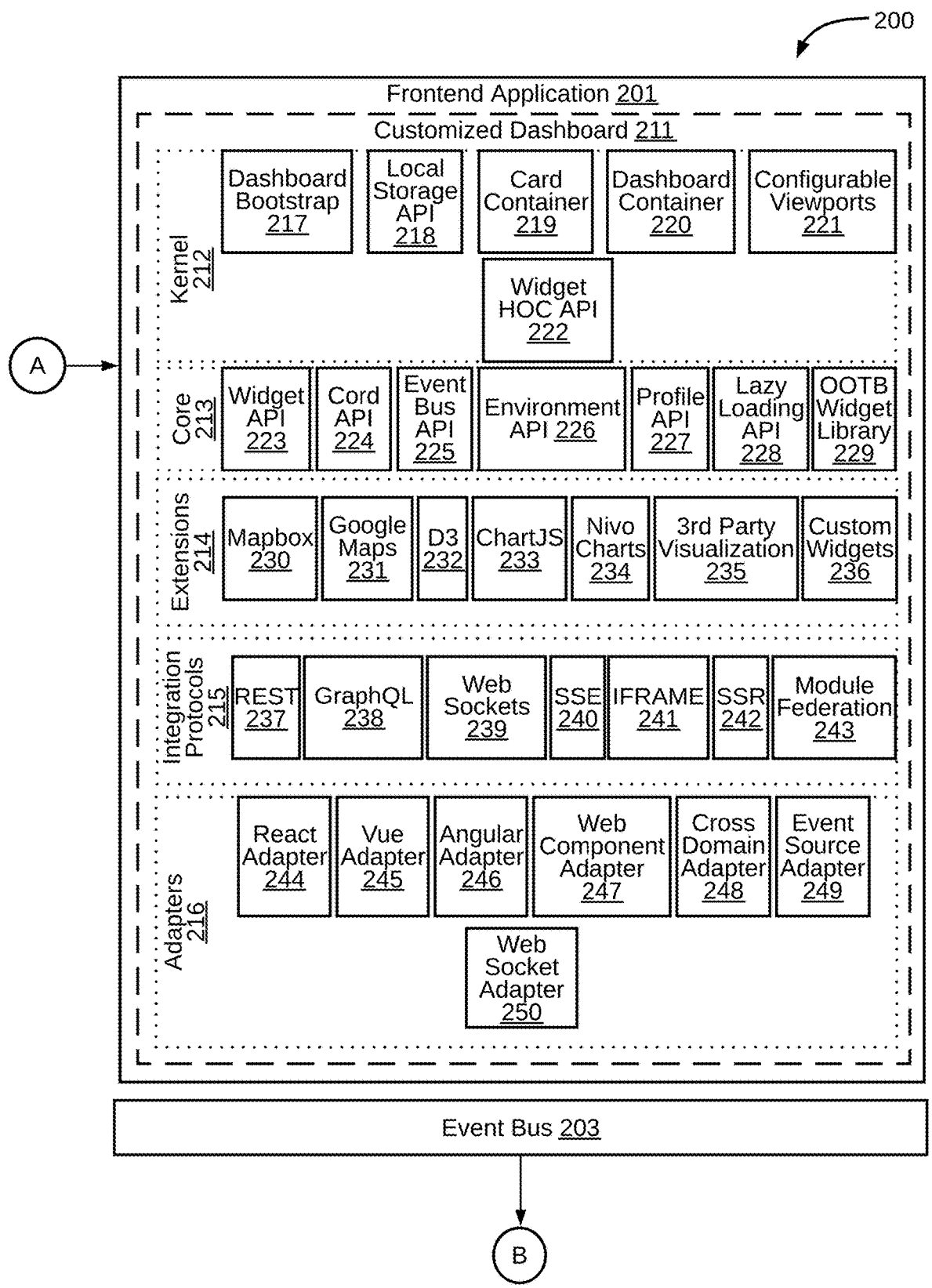
Figure 2C:
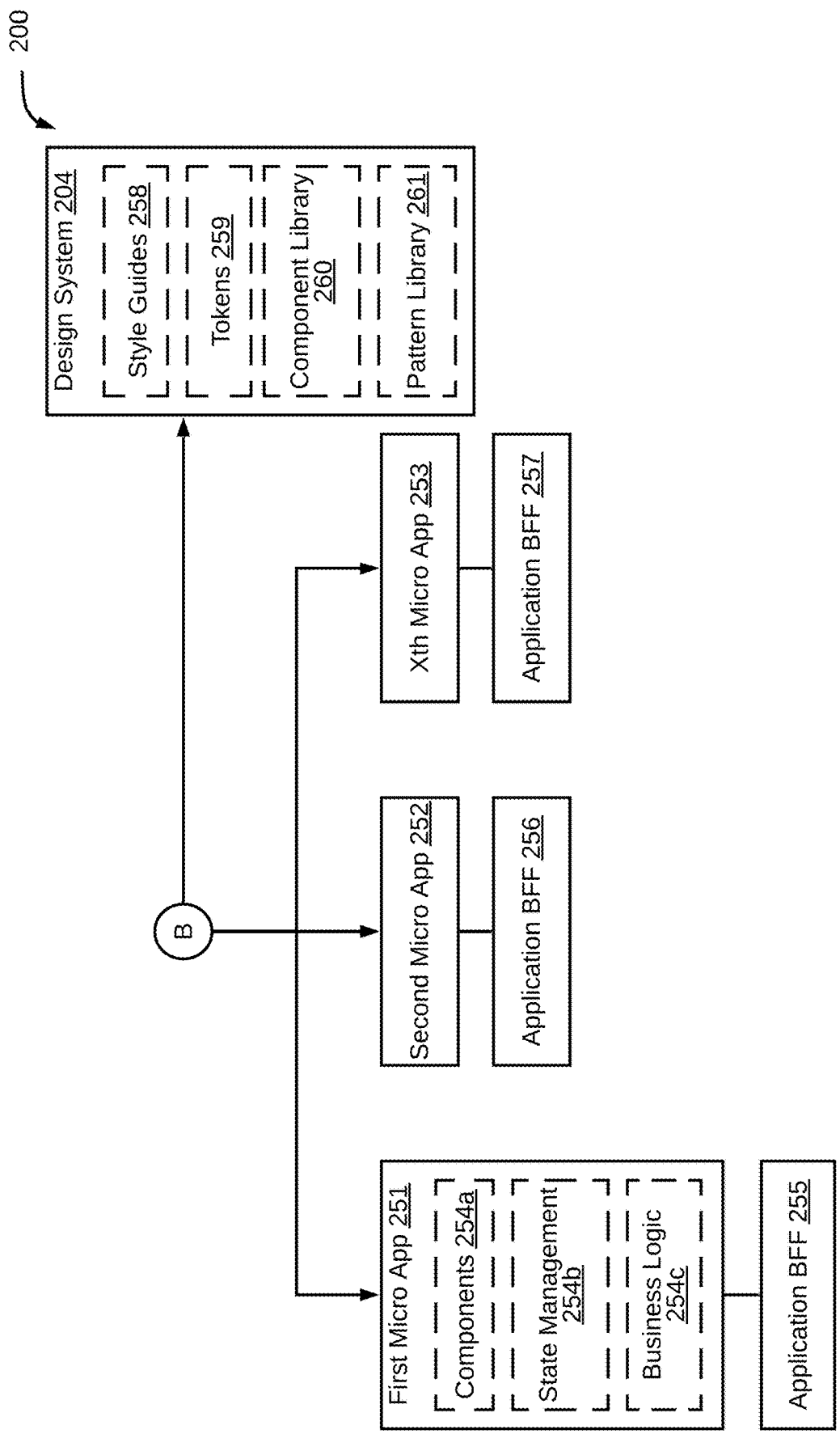

Referring now to FIGS. 2A-C, a functional block diagram of an end computing device 200 is illustrated, in accordance with some embodiments of the present disclosure. The system 200 may include, within a memory, a frontend application 201. Further, system 200 may include a dashboard server 202, an event bus 203, a design system 204, and a set of micro applications. In some embodiments, the memory may be analogous to the end computing device 101 implemented by the system 100. The dashboard server 202 may include an out of the box (OOTB) widget library 205, a plurality of customization extensions 206, a dashboarding module 207, a data layer 208, a security layer 209, and an integration layer 210. It may be noted that the dashboard 202 may be analogous to the application server 108 of the system 100. Further, the dashboard server 202 may receive data for the plurality of third-party widgets from external data sources 262. By way of an example, the external data sources 262 may be based on a Representational State Transfer (REST), a Simple Object Access Protocol (SOAP), a Structured Query Language (SQL), event streams, and the like.

The frontend application 201 may initiate the schema-less dashboard canvas through the dashboarding module 207. The frontend application 201 may be a Single Page Application (SPA) or a micro frontend application integrated with a micro frontend solution such as, but not limited to, SingleSPA, Piral.io, Module Federation (Webpack 5), Zoid (Cross Domain (Framing), and the like. Further, the frontend application 201 may invoke a server-less library. The server-less library may include a plurality of native widgets and a plurality of adaptors corresponding to a plurality of third-party widgets. The plurality of third-party widgets may be based on one or more different UI technologies and one or more different data schemas. Further, a user may select a set of widgets from the plurality of native widgets and from the plurality of third-party widgets. The frontend application 201 may integrate the set of widgets with the schema-less dashboard canvas to obtain a customized dashboard 211. The customized dashboard 211 may include a kernel 212, a core 213, extensions 214, integration protocols 215, and adapters 216.

The kernel 212 may include a dashboard bootstrap 217, a local storage application programming interface (API) 218, a card container 219, a dashboard container 220, configurable viewports 221, and a widget HOC API 222. The core 213 may include APIs such as, but not limited to, a widget API 223, a cord API 224, an event bus API 225, an environment API 226, a profile API 227, a lazy loading API 228, an OOTB widget library 229, and the like. The extensions 214 may include feature extensions such as, but not limited to, Mapbox® 230, Google® Maps 231, D3 232, ChartJS 233, Nivo Charts 234, third-party visualization 235, custom widgets 236, and the like. The integration protocols 215 may include REST 237, GraphQL 238, WebSocket 239, Server-Sent Events (SSE) 240, IFRAME 241, Server-Side Rendering (SSR) 242, and module federation 243. The adapters 216 may include React adapter 244, Vue adapter 245, Angular adapter 246, web component adapter 247, cross domain adapter 248, event source adapter 249, and WebSocket adapter 250.

In an embodiment, the frontend application 201 may provide for direct integration of one or more of the plurality of third-party widgets from the set of widgets selected by the user. In an alternative embodiment, the frontend application 201 may provide for distributed integration one or more of the plurality of third-party widgets via a shared event bus (such as the event bus 203) from the set of widgets selected by the user. The event bus 203 may be a channel to exchange data between the one or more of the plurality of third-party widgets and the frontend application 201. Each of the set of widgets may be integrated with the customized dashboard 211 in form of a micro frontend application (for example, a first micro application 251, a second micro application 252, ..., $x^{th}$ micro application 253, ..., and so on). Further, each of the first micro application 251, the second micro application 252, and the $x^{th}$ micro application 253 may include one or more components 254a, a state management library 254b, and a business logic 254c. For ease of explanation, only the first micro application 251 is depicted as including the one or more components 254a, the state management library 254b, and the business logic 254c. Further, the micro frontend application may include a Backend for Frontend (BFF). By way of an example, an application BFF 255 may correspond to the first micro application 251, an application BFF 256 may correspond to the second micro application 252, and an application BFF 257 may correspond to the $x^{th}$ micro application 253.

Further, the design system 204 may store at least one of a layout and a design of the customized dashboard 211. In an embodiment, the design system 204 may associate the at least one of the layout and the design with a user account of the user for subsequent rendering of the customized dashboard 211 for the user. The design system 204 may include style guides 258, tokens 259, a component library 260, and a pattern library 261.

It should be noted that all such aforementioned modules 201-223 may be represented as a single module or a combination of different modules. Further, as will be appreciated by those skilled in the art, each of the modules 201-223 may reside, in whole or in parts, on one device or multiple devices in communication with each other. In some embodiments, each of the modules 201-223 may be implemented as dedicated hardware circuit comprising custom application-specific integrated circuit (ASIC) or gate arrays, off-the-shelf semiconductors such as logic chips, transistors, or other discrete components. Each of the modules 201-223 may also be implemented in a programmable hardware device such as a field programmable gate array (FPGA), programmable array logic, programmable logic device, and so forth. Alternatively, each of the modules 201-223 may be implemented in software for execution by various types of processors (e.g., processor 102). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for generating and rendering a customized dashboard. For example, the exemplary system 100 and the associated end computing device 101, 200 may generate and render a customized dashboard by the processes discussed herein. In particular, as will be appreciated by those of ordinary skill in the art, control logic and/or automated routines for performing the techniques and steps described herein may be implemented by the system 100 and the associated end computing device 101, 200 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
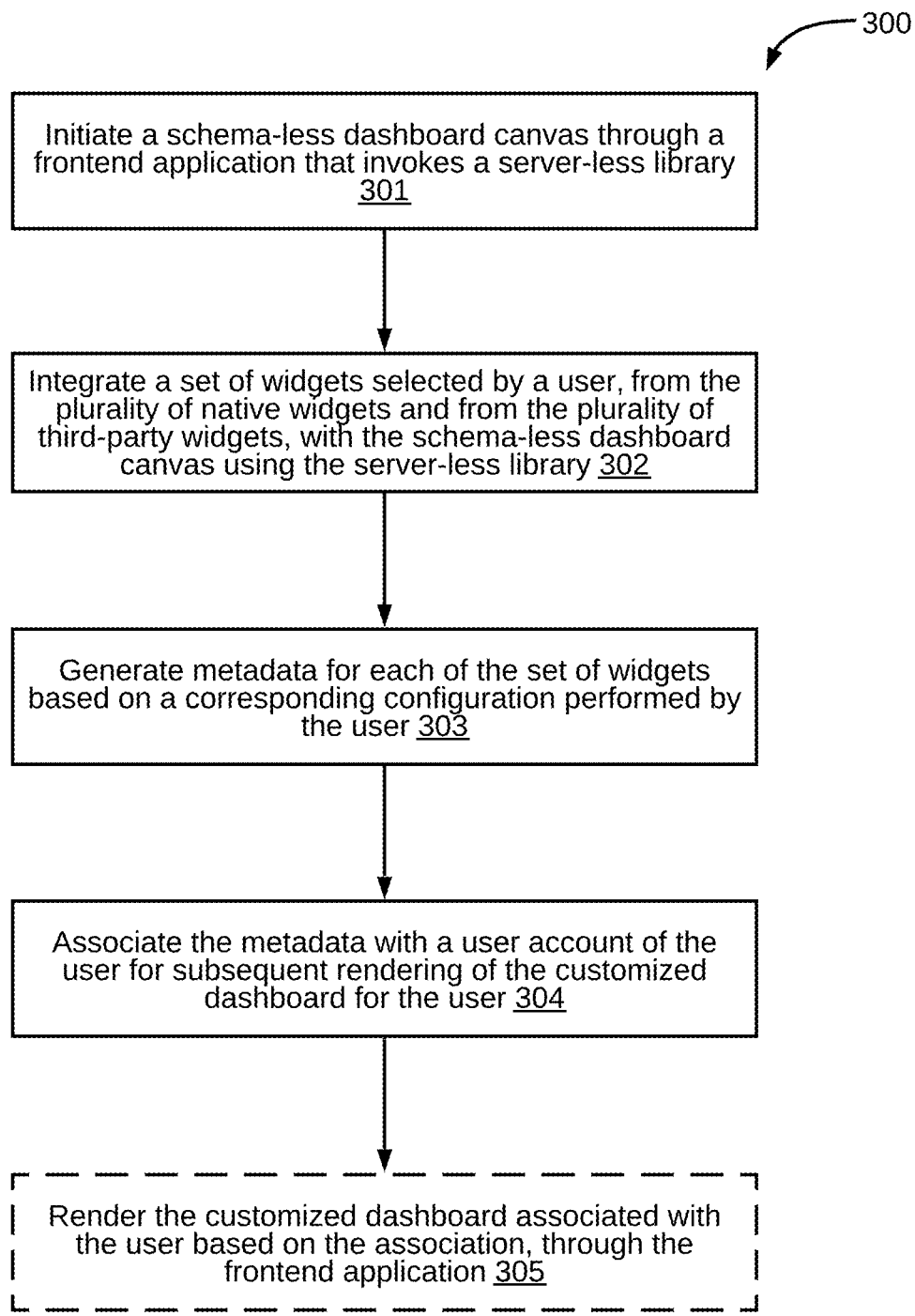
FIG. 3 illustrates a flow diagram of an exemplary process for generating and rendering a customized dashboard, in accordance with some embodiments of the present disclosure.

Referring now to FIG. 3, an exemplary process 300 for generating and rendering a customized dashboard (for example, the customized dashboard 211) is depicted via a flowchart, in accordance with some embodiments of the present disclosure. The process 300 may be implemented by the end computing device 101 of the system 100. The process 300 may include initiating a schema-less dashboard canvas through a frontend application (for example, the frontend application 201) that invokes a server-less library, at step 301. It may be noted that the server-less library includes a plurality of native widgets and a plurality of adaptors corresponding to a plurality of third-party widgets. The plurality of third-party widgets is based on one or more different UI technologies and one or more different data schemas. In an embodiment, the server-less library may include a widget registry for storing the plurality of native widgets and the plurality of adaptors corresponding to the plurality of third-party widgets.

In an embodiment, the frontend application may include at least one of: a standalone application and one or more micro frontend applications. In such an embodiment, the standalone application may include the plurality of adaptors, a set of integration protocols, a set of feature extensions, a set of application programming interfaces (APIs), and a set of kernels. Each of the one or more micro frontend applications may include one or more components, a business logic, and a state management library. It may be noted that the frontend application provides for at least one of direct integration of one or more of the plurality of third-party widgets, and distributed integration one or more of the plurality of third-party widgets via a shared event bus.

In an embodiment, the end computing device 101 may register each of the plurality of third-party widgets is registered with the schema-less dashboard canvas. The registering includes updating the server-less library with an adaptor corresponding to a third-party widget. The registering may be performed upon receiving a user command for integrating a third-party widget which is unavailable in the widget registry. Alternatively, the registering may be performed automatically when a new third-party widget is added to an external widget database. It may be noted that the external widget database is communicatively coupled with the end computing device 101. Further, the end computing device 101 may delist one or more of the plurality of third-party widgets from the schema-less dashboard canvas. The delisting includes removing one or more adaptors, corresponding to the one or more of the plurality of third-party widgets, from the server-less library. The delisting may be performed upon receiving a user command to remove a third-party widget from the widget registry. Alternatively, the delisting may be performed automatically when a third-party widget is removed from an external widget database (for example, the external data sources 262). It may be noted that the external widget database is communicatively coupled with the end computing device 101.

Further, the process 300 may include integrating a set of widgets selected by a user, from the plurality of native widgets and from the plurality of third-party widgets, with the schema-less dashboard canvas using the server-less library, at step 302. The one or more of the selected third-party widgets from the set of widgets may be integrated using one or more corresponding adaptors. It may be noted that each of the set of widgets is independently configurable by the user to generate the customized dashboard. Further, the process 300 may include generating metadata for each of the set of widgets based on a corresponding configuration performed by the user, at step 303. The metadata may include a set of unique widget properties. In an embodiment, the set of unique widget properties may include one or more widget identification parameters, one or more widget visualization parameters, one or more widget data schema parameters, one or more widget data security parameters, one or more widget state parameters, and one or more widget rendering components. Further, the process 300 may include associating the metadata with a user account of the user for subsequent rendering of the customized dashboard for the user, at step 304. Further, the process 300 may include rendering the customized dashboard associated with the user based on the association, through the frontend application, at step 305. Further, the user may remove one or more of the set of widgets from the customized dashboard. In an embodiment, removing includes dissociating or removing the metadata corresponding to the one or more of the set of widgets from the user account.

Figure 4:
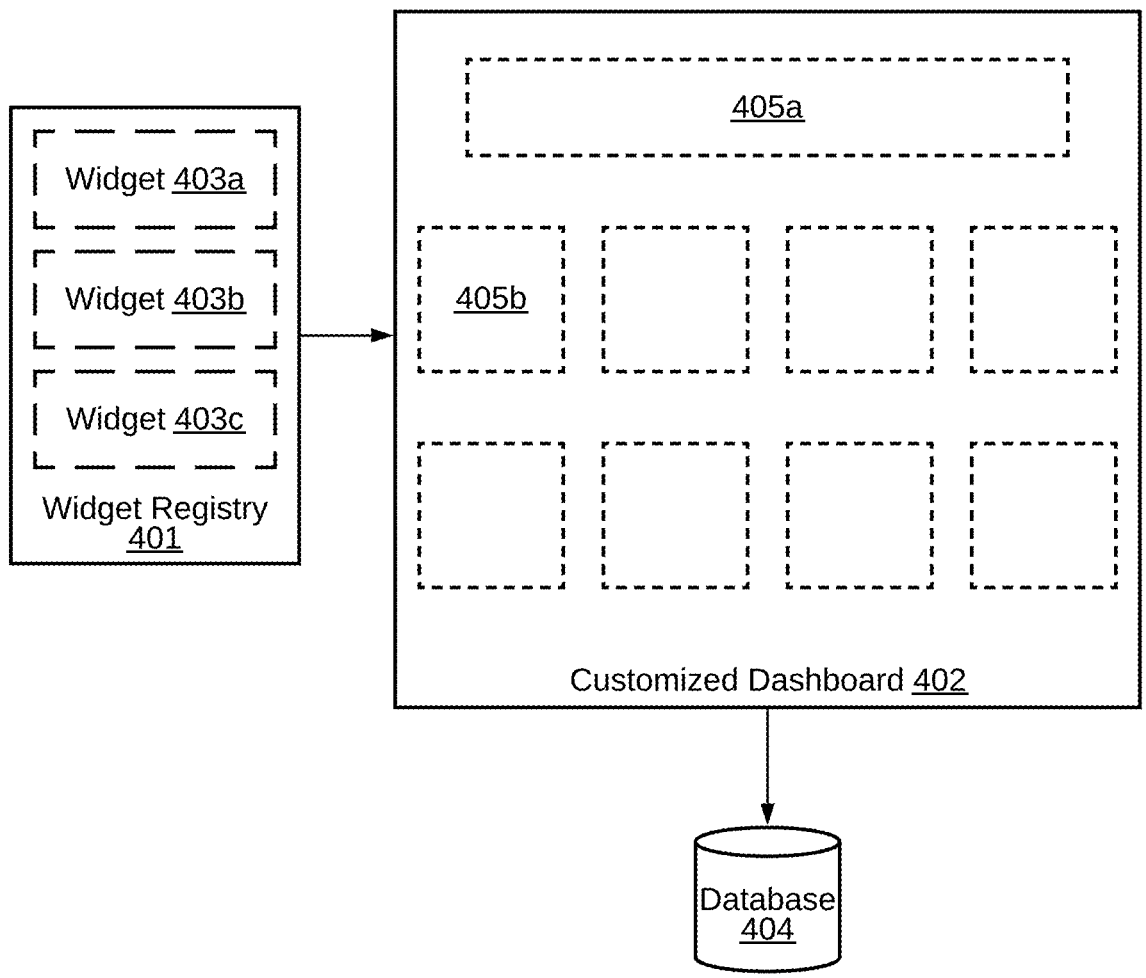
FIG. 4 illustrates integration of a widget from a widget registry with a customized dashboard, in accordance with some embodiments of the present disclosure.

Referring now to FIG. 4, integration of a widget from a widget registry 401 with a customized dashboard 402 is illustrated, in accordance with some embodiments of the present disclosure. The end computing device 101 may register each of a plurality of third-party widgets (for example, a widget 403a, a widget 403b, and a widget 403c) with the schema-less dashboard canvas. The registering includes updating the widget registry 401 in the server-less library with an adaptor corresponding to a third-party widget. In an embodiment, a third-party widget may be registered based on a user command. In an alternative embodiment, the third-party widget may be automatically registered via an API associated with the third-party widget. The customized dashboard 402 may be initiated as a schema-less dashboard canvas by the frontend application (for example, the frontend application 201). Further, the customized dashboard 402 may be stored in a database 404 for subsequent rendering. The customized dashboard 402 may include a grid for adding a widget. The grid may be responsive and may include flexible and resizable containers (for example, a container 405a and a container 405b). It should be noted that a widget may be added to each of the flexible and resizable containers. In an embodiment, a user may drag and drop a widget from the widget registry to one of the containers. By way of an example, the user may drag and drop the widget 403a to the container 405b of the customized dashboard 402. Alternatively, the user may select a widget from the widget registry 401, and then select a container in the customized dashboard 402 to integrate the widget with the customized dashboard 402.

Figure 5:
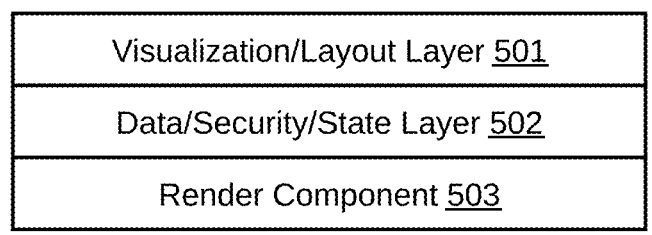
FIG. 5 illustrates a set of unique widget properties in metadata corresponding to a widget, in accordance with some embodiments of the present disclosure.

Referring now to FIG. 5, a set of unique widget properties in metadata 500 corresponding to a widget is illustrated, in accordance with some embodiments of the present disclosure. The metadata 500 may include a visualization/layout layer 501, data/security/state layer 502, and a render component 503. The visualization/layout layer 501 may include at least one of one or more widget identification parameters and one or more widget visualization parameters. It may be noted that the visualization/layout layer 501 defines the visual and layout aspects of the widget including rendering third-party components such as D3. The visualization/layout layer 501 may bind data received from the data/security/state layer 502 and the render component 503 to visualization components of the widget. Further, the data/security/state layer 502 may include at least one of one or more widget data schema parameters, one or more widget data security parameters, and one or more widget state parameters. The data/security/state layer 502 may perform importing of data, security token management and manage a state of the widget state.

Further, the render component 503 may include one or more widget rendering components. In some embodiments, the render component 503 may provide a façade to render components. Further, the render component 503 may support polyglot UI frameworks (for example, React, Vue, and the like) and web components. In some embodiments, the render component 503 may support various rendering technologies including iFrames and may leverage cross domain components. It should be noted that the render component 503 is flexible and extensible based on a pattern of an adaptor associated with a third-party widget. By way of an example, an adaptor for webpack 5 module federation may be created to share remotely hosted modules and components in the customized dashboard 402.

Figure 6:
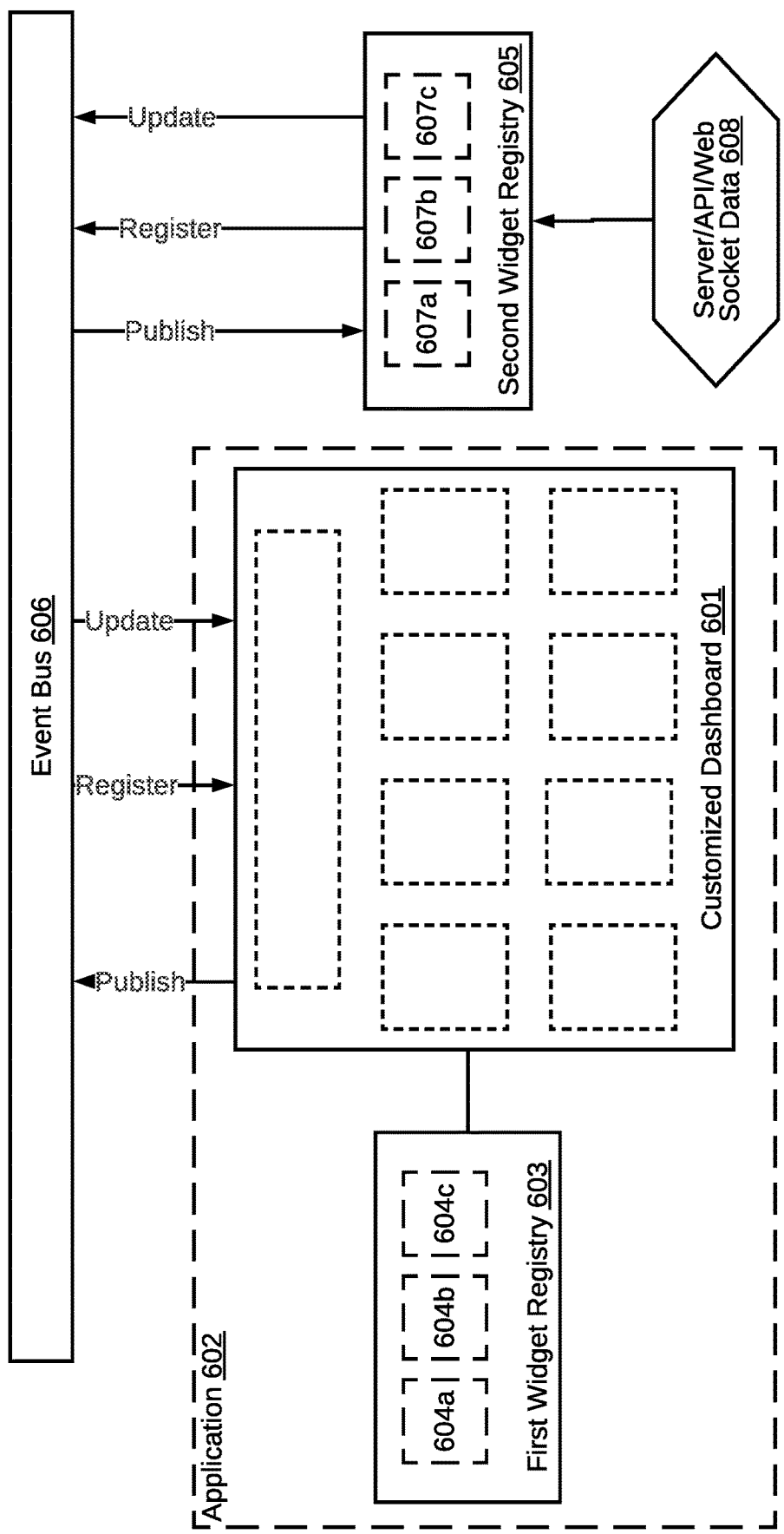
FIG. 6 illustrates registration and integration of third-party widgets with a customized dashboard, in accordance with some embodiments of the present disclosure.

Referring now to FIG. 6, registration and integration of third-party widgets with a customized dashboard 601 is illustrated, in accordance with some embodiments of the present disclosure. It may be noted that an application 602 may include the customized dashboard 601 and a first widget registry 603. The application 602 may be analogous to the frontend application 201. The first widget registry 603 may include a plurality of third-party widgets (such as, a third-party widget 604a, a third-party widget 604b, and a third-party widget 604c). By way of an example, the end computing device 101 may register the third-party widget 604a with the first widget registry 603. It should be noted that the registering may include updating the server-less library with an adaptor corresponding to the third-party widget 604a. Further, the third-party widget 604a may be directly integrated with the customized dashboard 601.

Further, the customized dashboard 601 may register a third-party widget from a second widget registry 605 via a shared event bus 606. The second widget registry 605 may include a third-party widget 607a, a third-party widget 607b, and a third-party widget 607c. Each of the third-party widget 607a, the third-party widget 607b, and the third-party widget 607c may be updated through Server/API/Web Socket Data 608. By way of an example, the end computing device 101 may register the third-party widget 607a with the first widget registry 603. It should be noted that the registering may include updating the server-less library with an adaptor corresponding to the third-party widget 604a. Further, the third-party widget 604a may be directly integrated with the customized dashboard 601.

The customized dashboard 601 may include a grid for adding a widget. The grid may be responsive and may include flexible and resizable containers. It should be noted that a widget may be added to each of the flexible and resizable containers. By way of an example, the following is an exemplary embodiment for registration of third-party widgets from the first widget registry 603 and the second widget registry 605.

A customized dashboard component library may be added as a dependency in the application 602. Further, a "DashboardGridContainer" component may be imported. The server-less library supports each of a common JavaScript (JS) for backward compatibility and ECMAScript (ES) Modules. The widget 604a may be registered with the first widget registry 603. Further, the widget 604a may be directly integrated with the customized dashboard 601. It may be noted that a widget (such as, an OOTB widget) from a micro frontend independent of the application 602 may be integrated with the customized dashboard 601 at runtime via the shared event bus 606. In an embodiment, the second widget registry 605 may be a micro frontend independent of the application 602. The second widget registry 605 may connect with the shared event bus 606 and publish widgets 607a and 607b to the shared event bus 606. Further, the event bus 606 may integrate the widgets 607a and 607b with the customized dashboard 601.

Referring now to FIG. 7, an exemplary table 700 of a set of unique widget properties in metadata (for example, the metadata 500) corresponding to a set of widgets is illustrated, in accordance with some embodiments of the present disclosure. The table 700 includes a layout layer 701, a data layer 702, and a render component 703. Each of the set of widgets may include the layout layer 701, the data layer 702, and the render component 703. By way of an example, the layout layer 701 of a first widget may include "doughnut chart", the data layer 702 of the first widget may include "Options: Labels, datasets", and the render component 703 of the first widget may include "ChartJS". The layout layer 701 of a second widget may include "PieChart", the data layer 702 of the second widget may include "Options: Labels, datasets", and the render component 703 of the second widget may include "ChartJS".

The layout layer 701 of a third widget may include "LineChart", the data layer 702 of the third widget may include "Options: Labels, datasets", and the render component 703 of the third widget may include "ChartJS". The layout layer 701 of a fourth widget may include "Scatter Plot", the data layer 702 of the fourth widget may include "Data: Custom JSON, options: margin, xScale, yScale, colors, axisLeft, axisBottom, legends", and the render component 703 of the fourth widget may include "Nivo/D3/Scatter". The layout layer 701 of a fifth widget may include "Sun Burst", the data layer 702 of the fifth widget may include "Data: Custom JSON, options: margin, colors, childColor, identity, value, cornerRadius, borderWidth, borderColor, animate, motionStiffness, isInteractive", and the render component 703 of the fifth widget may include "Nivo/D3/burst".

The layout layer 701 of a sixth widget may include "Swarm Plot", the data layer 702 of the sixth widget may include "Data: Custom JSON, margin, axisTOP, . . . ", and the render component 703 of the sixth widget may include "Nivo/D3/Swarm". The layout layer 701 of a seventh widget may include "Stream", the data layer 702 of the seventh widget may include "Data: Custom JSON, margin, axisTOP, . . . ", and the render component 703 of the seventh widget may include "Nivo/D3/Stream". The layout layer 701 of an eighth widget may include "Choropleth", the data layer 702 of the eighth widget may include "Data: Custom JSON, margin, axisTOP, . . . ", and the render component 703 of the eighth widget may include "Nivo/D3/geo". The layout layer 701 of a ninth widget may include "Area Bump", the data layer 702 of the ninth widget may include "Data: Custom JSON, margin, axisTOP, . . . ", and the render component 703 of the ninth widget may include "Nivo/D3/Bump". The layout layer 701 of a tenth widget may include "Issue Counter" and the data layer 702 of the tenth widget may include "Data: Title, value, options: valueClasses".

Referring now to FIG. 8, an exemplary frontend application 800 implementing a customized dashboard 801 is illustrated, in accordance with some embodiments of the present disclosure. The server-less library includes a plurality of native widgets and a plurality of adaptors corresponding to a plurality of third-party widgets. The plurality of third-party widgets is based on one or more different UI technologies and one or more different data schemas. The plurality of third-party widgets may be registered with the schema-less dashboard canvas. The registering may include updating the server-less library with an adaptor corresponding to a third-party widget. Additionally, one or more of the plurality of third-party widgets may be delisted from the schema-less dashboard canvas. The delisting may include removing one or more adaptors, corresponding to the one or more of the plurality of third-party widgets, from the server-less library.

The customized dashboard 801 may include a set of widgets (for example, a widget 802 and a widget 803) selected by a user, from the plurality of native widgets and from the plurality of third-party widgets, integrated with the schema-less dashboard canvas using the server-less library. The schema-less dashboard canvas may include a grid for adding a widget. The grid may be responsive and may include flexible and resizable containers. It should be noted that a widget may be added to each of the flexible and resizable containers.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
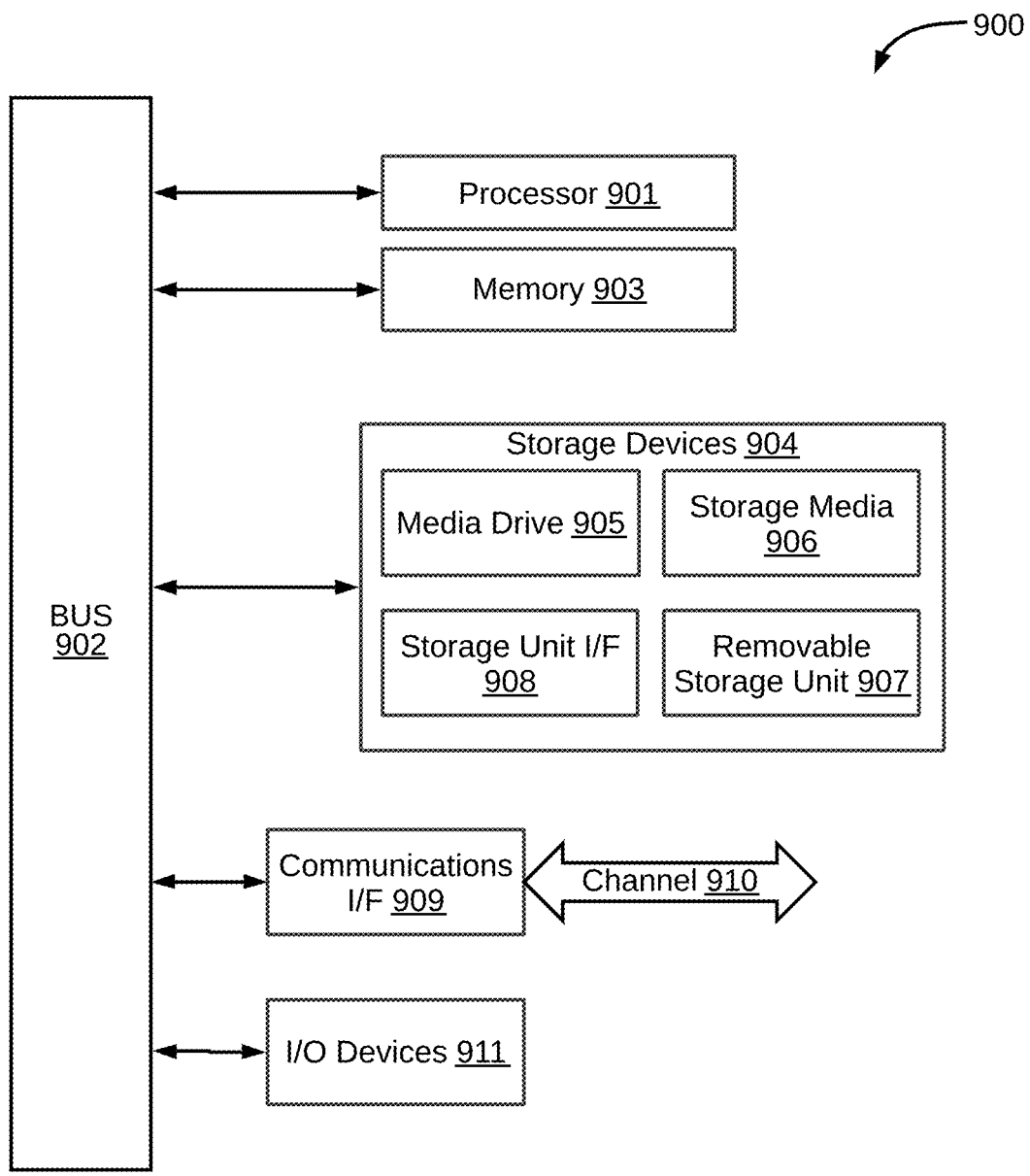
FIG. 9 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, an exemplary computing system 900 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 900 may represent, for example, a user device such as a desktop, a laptop, a mobile phone, personal entertainment device, DVR, and so on, or any other type of special or general-purpose computing device as may be desirable or appropriate for a given application or environment. The computing system 900 may include one or more processors, such as a processor 901 that may be implemented using a general or special purpose processing engine such as, for example, a microprocessor, microcontroller or other control logic. In this example, the processor 901 is connected to a bus 902 or other communication medium. In some embodiments, the processor 901 may be an Artificial Intelligence (AI) processor, which may be implemented as a Tensor Processing Unit (TPU), or a graphical processor unit, or a custom programmable solution Field-Programmable Gate Array (FPGA).

The computing system 900 may also include a memory 903 (main memory), for example, Random Access Memory (RAM) or other dynamic memory, for storing information and instructions to be executed by the processor 901. The memory 903 also may be used for storing temporary variables or other intermediate information during execution of instructions to be executed by the processor 901. The computing system 900 may likewise include a read only memory ("ROM") or other static storage device coupled to bus 902 for storing static information and instructions for the processor 901.

The computing system 900 may also include a storage devices 904, which may include, for example, a media drive 905 and a removable storage interface. The media drive 905 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 906 may include, for example, a hard disk, magnetic tape, flash drive, or other fixed or removable medium that is read by and written to by the media drive 905. As these examples illustrate, the storage media 906 may include a computer-readable storage medium having stored therein particular computer software or data.

In alternative embodiments, the storage devices 904 may include other similar instrumentalities for allowing computer programs or other instructions or data to be loaded into the computing system 900. Such instrumentalities may include, for example, a removable storage unit 907 and a storage unit interface 908, such as a program cartridge and cartridge interface, a removable memory (for example, a flash memory or other removable memory module) and memory slot, and other removable storage units and interfaces that allow software and data to be transferred from the removable storage unit 907 to the computing system 900.

The computing system 900 may also include a communications interface 909. The communications interface 909 may be used to allow software and data to be transferred between the computing system 900 and external devices. Examples of the communications interface 909 may include a network interface (such as an Ethernet or other NIC card), a communications port (such as for example, a USB port, a micro USB port), Near field Communication (NFC), etc. Software and data transferred via the communications interface 909 are in the form of signals which may be electronic, electromagnetic, optical, or other signals capable of being received by the communications interface 909. These signals are provided to the communications interface 909 via a channel 910. The channel 910 may carry signals and may be implemented using a wireless medium, wire or cable, fiber optics, or other communications medium. Some examples of the channel 910 may include a phone line, a cellular phone link, an RF link, a Bluetooth link, a network interface, a local or wide area network, and other communications channels.

The computing system 900 may further include Input/Output (I/O) devices 911. Examples may include, but are not limited to a display, keypad, microphone, audio speakers, vibrating motor, LED lights, etc. The I/O devices 911 may receive input from a user and also display an output of the computation performed by the processor 901. In this document, the terms "computer program product" and "computer-readable medium" may be used generally to refer to media such as, for example, the memory 903, the storage devices 904, the removable storage unit 907, or signal(s) on the channel 910. These and other forms of computer-readable media may be involved in providing one or more sequences of one or more instructions to the processor 901 for execution. Such instructions, generally referred to as "computer program code" (which may be grouped in the form of computer programs or other groupings), when executed, enable the computing system 900 to perform features or functions of embodiments of the present invention.

In an embodiment where the elements are implemented using software, the software may be stored in a computer-readable medium and loaded into the computing system 900 using, for example, the removable storage unit 907, the media drive 905 or the communications interface 909. The control logic (in this example, software instructions or computer program code), when executed by the processor 901, causes the processor 901 to perform the functions of the invention as described herein.

Thus, the disclosed method and system try to overcome the technical problem of generating and rendering a customized dashboard. The method and system provide a server-less Software Development Kit (SDK) library for generating and rendering customized dashboard with resizable and flexible grid for including widgets, and a web-based micro frontend dash-boarding platform. Further, the server-less library may include a flexible and extensible dash-boarding API that serves as a platform to host dashboards. The frontend application may aggregate decoupled widgets across multiple technologies and external data sources supported via adaptors. Further, a user may add customized widgets or leverage the out of the box (OOTB) widget library to configure pre-defined widgets. Further, the frontend application provides a flexible data integration avoiding a vendor or technology lock-in. Parts of the customized dashboard may be extended, replaced, and upgraded without affecting the integrated widgets. Additional hardware is not required to resize the flexible grid. The frontend application is adaptable, server-less and may be deployed as a stand-alone SPA directly on CDN/Edge or integrated into a micro frontend solution.

As will be appreciated by those skilled in the art, the techniques described in the various embodiments discussed above are not routine, or conventional, or well understood in the art. The techniques discussed above provide for generating and rendering a customized dashboard. The techniques first initiate a schema-less dashboard canvas through a frontend application that invokes a server-less library. The server-less library may include a plurality of native widgets and a plurality of adaptors corresponding to a plurality of third-party widgets. The plurality of third-party widgets may be based on one or more different UI technologies and one or more different data schemas. The techniques may then integrate a set of widgets selected by a user, from the plurality of native widgets and from the plurality of third-party widgets, with the schema-less dashboard canvas using the server-less library. One or more of the selected third-party widgets from the set of widgets may be integrated using one or more corresponding adaptors. Each of the set of widgets may be independently configurable by the user to generate the customized dashboard. The techniques may then generate metadata for each of the set of widgets based on a corresponding configuration performed by the user. The metadata may include a set of unique widget properties. The techniques may then associate the metadata with a user account of the user for subsequent rendering of the customized dashboard for the user.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for generating and rendering a customized dashboard. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating and rendering a customized dashboard, the method comprising:

initiating, by an end computing device, a schema-less dashboard canvas through a frontend application that invokes a server-less library, wherein the server-less library comprises a plurality of native widgets and a plurality of adaptors corresponding to a plurality of third-party widgets, and wherein the plurality of third-party widgets is based on one or more different user interface (UI) technologies and one or more different data schemas;

integrating, by the end computing device, a set of widgets selected by a user, from the plurality of native widgets and from the plurality of third-party widgets, with the schema-less dashboard canvas using the server-less library, wherein one or more of the selected third-party widgets from the set of widgets are integrated using one or more corresponding adaptors, and wherein each of the set of widgets is independently configurable by the user to generate the customized dashboard;

generating, by the end computing device, metadata for each of the set of widgets based on a corresponding configuration performed by the user, wherein the metadata comprise a set of unique widget properties; and associating, by the end computing device, the metadata with a user account of the user for subsequent rendering of the customized dashboard for the user.

2. The method of claim 1, further comprising, at least one of:

registering, by the end computing device, each of the plurality of third-party widgets with the schema-less dashboard canvas, wherein registering comprises updating the server-less library with an adaptor corresponding to a third-party widget; and delisting, by the end computing device, one or more of the plurality of third-party widgets from the schema-less dashboard canvas, wherein delisting comprises removing one or more adaptors, corresponding to the one or more of the plurality of third-party widgets, from the server-less library.

3. The method of claim 1, further comprising:

rendering, by the end computing device, the customized dashboard associated with the user based on the association, through the frontend application.

4. The method of claim 1, further comprising:

removing, by the end computing device, one or more of the set of widgets from the customized dashboard, wherein removing comprises dissociating or removing the metadata corresponding to the one or more of the set of widgets from the user account.

5. The method of claim 1, wherein the frontend application comprises at least one of: a standalone application and one or more micro frontend applications, wherein the standalone application comprises the plurality of adaptors, a set of integration protocols, a set of feature extensions, a set of application programming interfaces (APIs), and a set of kernels, and wherein each of the one or more micro frontend applications comprises one or more components, a business logic, and a state management library.

6. The method of claim 5, wherein the frontend application provides for at least one of: direct integration of one or more of the plurality of third-party widgets, and distributed integration of one or more of the plurality of third-party widgets via a shared event bus.

7. The method of claim 1, wherein the set of unique widget properties comprises one or more widget identification parameters, one or more widget visualization parameters, one or more widget data schema parameters, one or more widget data security parameters, one or more widget state parameters, and one or more widget rendering components.

8. A system for generating and rendering a customized dashboard, the system comprising:

a processor; and a memory communicatively coupled to the processor, wherein the memory stores processor instructions, which when executed by the processor, cause the processor to:

initiate a schema-less dashboard canvas through a frontend application that invokes a server-less library, wherein the server-less library comprises a plurality of native widgets and a plurality of adaptors corresponding to a plurality of third-party widgets, and wherein the plurality of third-party widgets is based on one or more different user interface (UI) technologies and one or more different data schemas;

integrate a set of widgets selected by a user, from the plurality of native widgets and from the plurality of third-party widgets, with the schema-less dashboard canvas using the server-less library, wherein one or more of the selected third-party widgets from the set of widgets are integrated using one or more corresponding adaptors, and wherein each of the set of widgets is independently configurable by the user to generate the customized dashboard;

generate metadata for each of the set of widgets based on a corresponding configuration performed by the user, wherein the metadata comprise a set of unique widget properties; and associate the metadata with a user account of the user for subsequent rendering of the customized dashboard for the user.

9. The system of claim 8, wherein the processor instructions, on execution, further cause the processor to, at least one of:

register each of the plurality of third-party widgets with the schema-less dashboard canvas, wherein registering comprises updating the server-less library with an adaptor corresponding to a third-party widget; and delist one or more of the plurality of third-party widgets from the schema-less dashboard canvas, wherein delisting comprises removing one or more adaptors, corresponding to the one or more of the plurality of third-party widgets, from the server-less library.

10. The system of claim 8, wherein the processor instructions, on execution, further cause the processor to:

render the customized dashboard associated with the user based on the association, through the frontend application.

11. The system of claim 8, wherein the processor instructions, on execution, further cause the processor to:

remove one or more of the set of widgets from the customized dashboard, wherein removing comprises dissociating or removing the metadata corresponding to the one or more of the set of widgets from the user account.

12. The system of claim 8, wherein the frontend application comprises at least one of: a standalone application and one or more micro frontend applications, wherein the standalone application comprises the plurality of adaptors, a set of integration protocols, a set of feature extensions, a set of application programming interfaces (APIs), and a set of kernels, and wherein each of the one or more micro frontend applications comprises one or more components, a business logic, and a state management library.

13. The system of claim 12, wherein the frontend application provides for at least one of: direct integration of one or more of the plurality of third-party widgets, and distributed integration of one or more of the plurality of third-party widgets via a shared event bus.

14. The system of claim 8, wherein the set of unique widget properties comprises one or more widget identification parameters, one or more widget visualization parameters, one or more widget data schema parameters, one or more widget data security parameters, one or more widget state parameters, and one or more widget rendering components.

15. A non-transitory computer-readable medium storing computer-executable instructions for generating and rendering a customized dashboard, the computer-executable instructions configured for:

initiating a schema-less dashboard canvas through a frontend application that invokes a server-less library, wherein the server-less library comprises a plurality of native widgets and a plurality of adaptors corresponding to a plurality of third-party widgets, and wherein the plurality of third-party widgets is based on one or more different user interface (UI) technologies and one or more different data schemas;

integrating a set of widgets selected by a user, from the plurality of native widgets and from the plurality of third-party widgets, with the schema-less dashboard canvas using the server-less library, wherein one or more of the selected third-party widgets from the set of widgets are integrated using one or more corresponding adaptors, and wherein each of the set of widgets is independently configurable by the user to generate the customized dashboard;

generating metadata for each of the set of widgets based on a corresponding configuration performed by the user, wherein the metadata comprise a set of unique widget properties; and associating the metadata with a user account of the user for subsequent rendering of the customized dashboard for the user.

16. The non-transitory computer-readable medium of claim 15, wherein the computer-executable instructions are further configured for, at least one of:

registering each of the plurality of third-party widgets with the schema-less dashboard canvas, wherein registering comprises updating the server-less library with an adaptor corresponding to a third-party widget; and delisting one or more of the plurality of third-party widgets from the schema-less dashboard canvas, wherein delisting comprises removing one or more adaptors, corresponding to the one or more of the plurality of third-party widgets, from the server-less library.

17. The non-transitory computer-readable medium of claim 15, wherein the computer-executable instructions are further configured for:

rendering, by the end computing device, the customized dashboard associated with the user based on the association, through the frontend application.

18. The non-transitory computer-readable medium of claim 15, wherein the computer-executable instructions are further configured for:

removing, by the end computing device, one or more of the set of widgets from the customized dashboard, wherein removing comprises dissociating or removing the metadata corresponding to the one or more of the set of widgets from the user account.

19. The non-transitory computer-readable medium of claim 15, wherein the frontend application comprises at least one of: a standalone application and one or more micro frontend applications, wherein the standalone application comprises the plurality of adaptors, a set of integration protocols, a set of feature extensions, a set of application programming interfaces (APIs), and a set of kernels, and wherein each of the one or more micro frontend applications comprises one or more components, a business logic, and a state management library.

20. The non-transitory computer-readable medium of claim 19, wherein the frontend application provides for at least one of: direct integration of one or more of the plurality of third-party widgets, and distributed integration of one or more of the plurality of third-party widgets via a shared event bus.

* * * * *